US007787396B1

(12) United States Patent
Nalawade et al.

(10) Patent No.: US 7,787,396 B1
(45) Date of Patent: Aug. 31, 2010

(54) AUTOMATIC ORF-LIST CREATION FOR ROUTE PARTITIONING ACROSS BGP ROUTE REFLECTORS

(75) Inventors: Gargi Nalawade, San Jose, CA (US);
James N. Guichard, Groton, MA (US);
Luca Martini, Denver, CO (US)

(73) Assignee: Cisco Technology, Inc., San Jose, CA (US)

( * ) Notice: Subject to any disclaimer, the term of this patent is extended or adjusted under 35 U.S.C. 154(b) by 1345 days.

(21) Appl. No.: 10/855,769

(22) Filed: May 27, 2004

(51) Int. Cl.
*H04L 12/66* (2006.01)
(52) U.S. Cl. .................. 370/254; 370/356; 370/400
(58) Field of Classification Search .................. 370/229, 370/231, 237, 238, 254, 356, 395.31, 400, 370/401, 252, 392; 709/224, 225, 226, 235, 709/238, 239, 240, 242
See application file for complete search history.

(56) References Cited

U.S. PATENT DOCUMENTS

| | | | |
|---|---|---|---|
| 5,999,517 A | | 12/1999 | Koning et al. |
| 6,339,595 B1 * | | 1/2002 | Rekhter et al. ............. 370/392 |
| 6,584,093 B1 * | | 6/2003 | Salama et al. ............. 370/351 |
| 6,813,644 B1 * | | 11/2004 | Jamieson et al. ........... 709/242 |
| 6,938,095 B2 * | | 8/2005 | Basturk et al. ............ 709/238 |
| 6,999,454 B1 | | 2/2006 | Crump |
| 7,136,374 B1 * | | 11/2006 | Kompella ................. 370/352 |
| 7,274,704 B1 * | | 9/2007 | Ould-Brahim et al. ...... 370/409 |
| 2001/0032272 A1 | | 10/2001 | Fujita |
| 2002/0080798 A1 | | 6/2002 | Hariguchi et al. |
| 2002/0184388 A1 | | 12/2002 | Yaseen et al. |
| 2002/0191541 A1 | | 12/2002 | Buchanan et al. |
| 2004/0037275 A1 | | 2/2004 | Li et al. |
| 2004/0081154 A1 | | 4/2004 | Kouvelas |
| 2005/0094566 A1 | | 5/2005 | Hares |
| 2005/0182756 A1 | | 8/2005 | Eppley et al. |
| 2006/0029035 A1 | | 2/2006 | Chase et al. |
| 2006/0209716 A1 | | 9/2006 | Previdi et al. |

OTHER PUBLICATIONS

Network Working Group, RFC: 2547, "BGP/MPLS VPNs", Mar. 1999, www.ietf.org/rfc/rfc2547.txt.
Chen et al., "Cooperative Route Filtering Capability for BGP-4," Aug. 2003, Network Working Group, Internet Draft 10, URL: http://tools.ietf.org/html/draft-ietf-idr-route-filter10.
Network Working Group, Internet Draft, "Cooperative Route Filtering Capability for BGP-4," Aug. 2003, retrieved from Internet, URL: http://tools.ietf.org/html/draft-ietf-idr-route-filter-09.

* cited by examiner

*Primary Examiner*—Kevin C Harper
*Assistant Examiner*—Leon Andrews
(74) *Attorney, Agent, or Firm*—BainwoodHuang (57) ABSTRACT

A method, apparatus and computer program product for providing Outbound Route Filtering (ORF) is presented. An ORF list is produced and an ORF filter is built from the ORF list. The ORF list is built from received ORF entries. The ORF list is advertised to client and non-client peers. The ORF filter is built from a received ORF list and is directed toward the advertiser of the ORF list.

22 Claims, 3 Drawing Sheets

AUTOMATIC ORF-LIST CREATION FOR ROUTE PARTITIONING ACROSS BGP ROUTE REFLECTORS

BACKGROUND

The Border Gateway Protocol (BGP) is an interautonomous system routing protocol. An autonomous system (AS) is a network or group of networks under a common administration and with common routing policies. BGP is used to exchange routing information for the Internet and is the protocol used between Internet service providers (ISP). Customer networks usually employ an Interior Gateway Protocol (IGP) such as Routing Interior Protocol (RIP), which specifies how routers exchange routing table information. With RIP, routers periodically exchange entire tables. Another IGP is known as Open Shortest Path First (OSPF) protocol. In OSPF the routers use link-state algorithms to send routing information to all nodes in an internetwork by calculating the shortest path to each node based on a topography of the network constructed by each node. Each router sends the particular portion of the routing table that describes the state of its own links, and it also sends the complete routing structure (topography). An advantage of OSPF is that it results in smaller more frequent updates everywhere. The updates converge quickly, thus preventing such problems as routing loops and Count-to-Infinity (when routers continuously increment the hop count to a particular network). This makes for a more stable network.

Customers connect to ISPs, and ISPs use BGP to exchange customer and ISP routes. When BGP is used between autonomous systems the protocol is referred to as External BGP (EBGP). If a service provider is using BGP to exchange routes within an AS, then the protocol is referred to as Interior BGP (IBGP). BGP neighbors exchange full routing information when the TCP connection between neighbors is first established. When changes to the routing table are detected, the BGP routers send to their neighbors only those routes that have changed. BGP routers do not send periodic routing updates, and BGP routing updates advertise only the optimal path to a destination network.

BGP uses many route parameters, called attributes, to define routing policies and maintain a stable routing environment. Routes learned via BGP have associated properties (also referred to as attributes) that are used to determine the best route to a destination when multiple paths exist to a particular destination. These attributes include: Weight, Local Preference, Multi-Exit Discriminator, Origin, AS_Path, Next Hop and Community.

The Weight attribute is local to a router. The Weight attribute is not advertised to neighboring routers. If the router learns about more than one route to the same destination, the route with the highest weight will be preferred.

The Local Preference attribute is used to prefer an exit point from the local autonomous system (AS). Unlike the Weight attribute, the Local Preference attribute is propagated throughout the local AS. If there are multiple exit points from the AS, the Local Preference attribute is used to select the exit point for a specific route.

The Multi-Exit Discriminator (MED) or metric attribute is used as a suggestion to an external AS regarding the preferred route into the AS that is advertising the metric. The external AS that is receiving the MEDs may be using other BGP attributes for route selection.

The Origin attribute indicates how BGP learned about a particular route. The Origin attribute can have one of three possible values. A first possible value for the Origin attribute is IGP wherein the route is interior to the originating AS. This value is set when the network router configuration command is used to inject the route into BGP. Another possible value for the Origin attribute is EGP wherein the route is learned via the Exterior Border Gateway Protocol. A third possible value for the Origin attribute is Incomplete wherein the origin of the route is unknown or learned in some other way. An origin value of incomplete occurs when a route is redistributed into BGP. The Origin attribute is used for route selection.

The AS_Path attribute is used when a route advertisement passes through an AS. The AS number is added to an ordered list of AS numbers that the route advertisement has traversed.

The Next-Hop attribute is the IP address that is used to reach the advertising router. For EBGP peers, the next-hop address is the IP address of the connection between the peers. For IBGP, the EBGP next-hop address is carried into the local AS.

The Community attribute provides a way of grouping destinations, called communities, to which routing decisions (such as acceptance, preference, and redistribution) can be applied. Route maps are used to set the community attribute. Predefined community attributes include a no-export attribute, a no-advertise attribute and an Internet attribute. The no-export attribute denotes that this route should not be advertised to EBGP peers. The no-advertise attribute indicates that this route should not be advertised to any peer. The Internet attribute signifies this route should be advertised to the Internet community as all routers in the network belong to it.

BGP could possibly receive multiple advertisements for the same route from multiple sources. BGP selects only a single path as the best path. When the best path is selected, BGP puts the selected path in the IP routing table and propagates the path to its neighbors. BGP uses the following criteria, in the following order, to select a path for a destination:

1. If the path specifies a next hop that is inaccessible, drop the update.
2. Prefer the path with the largest weight.
3. If the weights are the same, prefer the path with the largest local preference.
4. If the local preferences are the same, prefer the path that was originated by BGP running on this router.
5. If no route was originated, prefer the route that has the shortest AS_path.
6. If all paths have the same AS_path length, prefer the path with the lowest origin type (where IGP is lower than EGP, and EGP is lower than incomplete).
7. If the origin codes are the same, prefer the path with the lowest MED attribute.
8. If the paths have the same MED, prefer the external path over the internal path.
9. If the paths are still the same, prefer the path through the closest IGP neighbor.
10. Prefer the path with the lowest IP address, as specified by the BGP router ID.

BGP also has mechanisms such as Outbound Route Filtering (ORF) which enable the proper set of Virtual Private Network (VPN) routing distribution constraints to be dynamically distributed. This reduces the management burden of setting up the constraints, and results in improved scalability.

Within a single routing domain it is common to have the IBGP routers peer directly with one or two route reflectors (described below), rather than having them peer directly with each other. This greatly reduces the number of IBGP adjacencies which any one router must support. Further, a route reflector does not merely redistribute routing information, it "digests" the information first, by running its own decision processes. Only routes which survive the decision process are redistributed.

A route reflector reflects routes between the two groups: client peers and all the other routers in the autonomous system (non-client peers). The route reflector and its client peers form a cluster. The non-client peers are fully meshed with each other, but the client peers need not be fully meshed. When the route reflector receives an advertised route from an external BGP speaker, the route is advertised to all clients and non-client peers. When the route reflector receives an advertised route from a non-client peer, the route is advertised to all clients. When the route reflector receives a route from a client, the route is advertised to all clients and non-client peers. Hence, the clients need not be fully meshed.

As a result, when route reflectors are used, the amount of routing information carried around the network, and in particular, the amount of routing information which any given router must receive and process, is greatly reduced. This greatly increases the scalability of the routing distribution system.

SUMMARY

Conventional mechanisms such as those explained above suffer from a variety of problems or deficiencies. One such problem is that in conventional systems a route reflector may not be able to adequately support the total number of routes used by the system. In such an instance, route reflector partitioning is used.

In route reflector partitioning, the VPN routes themselves are partitioned, with some route reflectors carrying one subset of the VPN routes and other route reflectors carrying a different subset. The route reflectors which carry the public Internet routes can also be completely separate from the route reflectors that carry the VPN routes. The use of outbound route filters allows any one Provider Edge (PE) router and any one route reflector to exchange information about only those VPNs which the PE and route reflector are both interested in. This in turn ensures that each PE and each route reflector receives routing information only about the VPNs which it is directly supporting.

Generally a PE device is restricted in the total number of routes it can support, whether those are public Internet routes or VPN routes. As a result, a PE device may be able to be attached to a larger number of VPNs if it does not also need to support Internet routes.

Similarly, if the customer networks served by a particular PE do not need Internet access, then that PE does not need to be aware of the Internet routes. If some or all of the VPNs served by a particular PE do need the Internet access, but the PE does not contain Internet routes, then the PE can maintain a default route that routes all the Internet traffic from that PE to a different router within the network, where other router hold the full the Internet routing table. With this approach the PE device needs only a single default route for all the Internet routes.

While the use of route reflector partitioning has been generally useful, the use of route reflector partitioning has some restrictions.

When a given VPN customer in one route reflector partitioning wants to form and extranet virtual private network with another VPN customer that has its routes in another partition, the use of route reflector partitions is not advantageous. In this case, configuration of the network must be changed by either moving VPN customers to different partitions, leaking routes between partitions, or adding additional partitions. None of these options are particularly desirable from an operational standpoint. Further, the above techniques can only be performed in VPN networks, therefore for Internet Protocol Version 4 (IPV4) routing, where the entire Internet table is present in the ISP core, there is no way to partition routes and limit or reduce the load on the route reflectors.

Embodiments of the invention significantly overcome such deficiencies and provide mechanisms and techniques that reduce load on route reflectors by building ORF lists and by building ORF filters from the ORF lists.

In a particular embodiment, an apparatus for providing ORF lists includes a route reflector in communication with at least one client. A client comprises a PE router or an Autonomous System Boundary Router (ASBR). The route reflector receives ORF entries from the at least one client and builds an ORF list from the ORF entries.

In another embodiment an apparatus for building Outbound Route Filtering (ORF) filters for performing ORF comprises a first route reflector in communication with a second router reflector. The second route reflector receives an ORF list from the first route reflector and builds an ORF filter towards the first route reflector from the ORF list.

In a particular embodiment of a method for providing ORF lists, the method includes receiving, at a route reflector, ORF entries from at least one client. An ORF list is built from the ORF entries. The ORF list is then advertised to internal non-client peers, and is also advertised to external non-client peers. A non-client peer comprises a route reflector.

In another embodiment, a method of building an Outbound Route Filtering (ORF) filter includes receiving, from a first route reflector, an ORF list at a second route reflector, the ORF list comprising multiple ORF entries received from at least one client by the first route reflector. The second route reflector builds an ORF filter towards the first route reflector from the ORF list received from the first route reflector.

In yet another embodiment a device for building an Outbound Route Filtering (ORF) list includes means for receiving ORF entries from at least one client. The device further includes means for building an ORF list from the ORF entries and means for advertising the ORF list to internal non-client peers and to external non-client peers.

Still another embodiment comprises a device for building an Outbound Route Filtering (ORF) filter. The device includes means for receiving an ORF list comprising multiple ORF entries. The device further includes means for building an ORF filter from the ORF list and means for directing the ORF filter towards an advertiser of the ORF list.

In still a further embodiment, a method of performing ORF filtering comprises providing an ORF list, the ORF list provided by receiving, at a first route reflector, ORF entries from at least one client and building an ORF list from the ORF entries. The method further includes advertising the ORF list to internal non-client peers and advertising the ORF list to external non-client peers. The method further includes receiving, from the first route reflector, the ORF list at a second route reflector and building, with said second route reflector, an ORF filter towards the first route reflector from the ORF list received from said first route reflector.

Another embodiment includes a system used for performing ORF filtering. The system includes a first Autonomous System (AS) comprising a first route reflector and a plurality of clients in communication with the first route reflector. The system also includes a second AS in communication with the first AS. The second AS includes a second route reflector and a second plurality of clients in communication with the second route reflector. In the system, the first route reflector receives ORF entries from at least one of the first plurality of clients and builds an ORF list from the ORF entries. The first route reflector advertises the ORF list to non-client peers within the first AS and to non-client peers with the second AS. The second route reflector receives the ORF list from the first route reflector and builds an ORF filter towards the first route reflector from the ORF list.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides ORF filtering as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing ORF lists and ORF filters as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A mechanism of building ORF lists and building ORF filters from the ORF lists is presented. The mechanism is useful for reducing the load on route reflectors in a network and therefore provides improved performance of the network.

Figure 1:
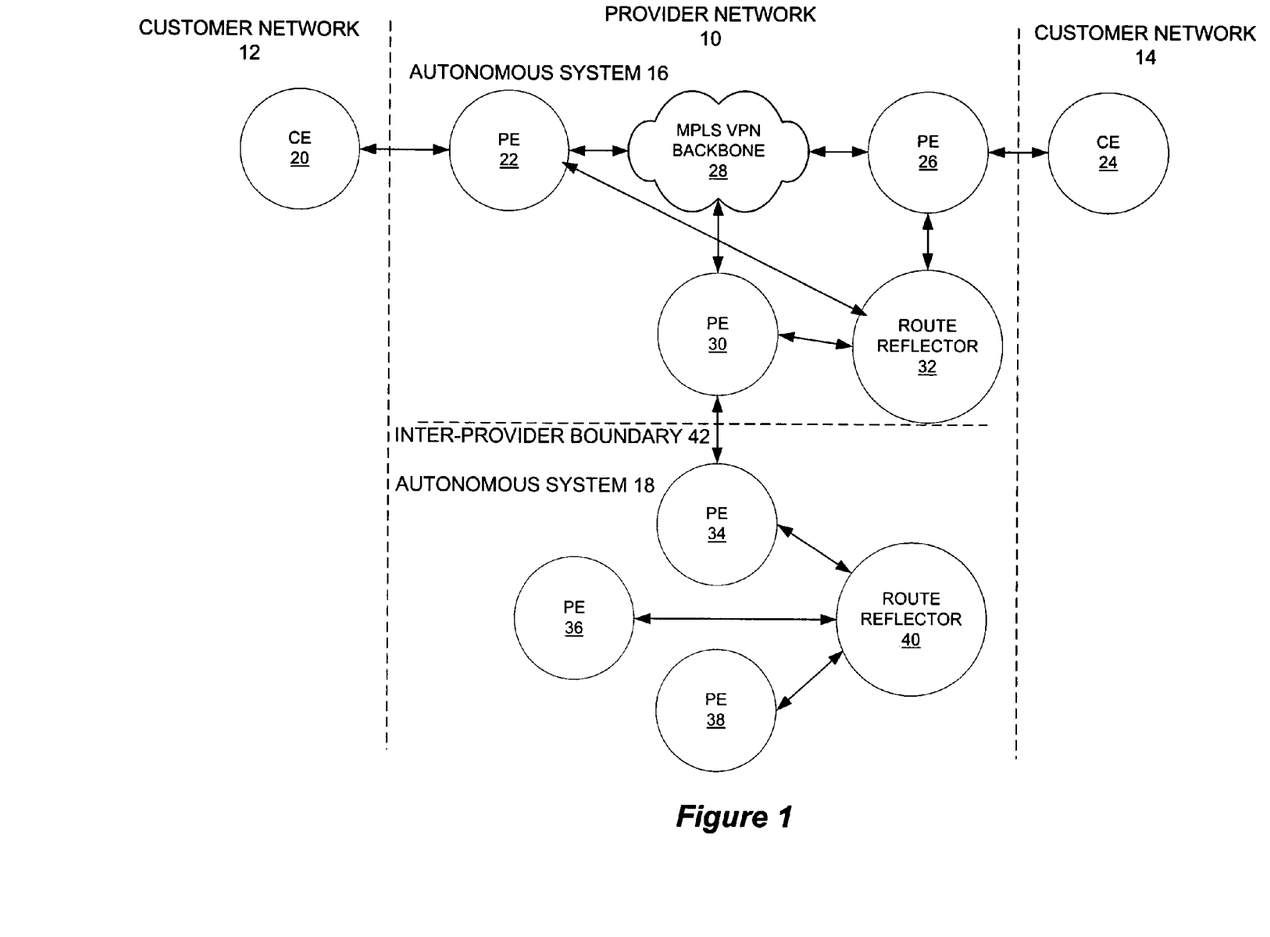
FIG. 1 comprises a block diagram of a particular embodiment of a network environment utilizing Outbound Route Filtering.

Referring now to FIG. 1, an environment for performing ORF filtering to provide reduced load on route reflectors is shown. The environment includes a provider network 10 in communication with a first customer network 12 and a second customer network 14. The provider network 10 includes a first autonomous system 16 and a second autonomous system 18. The autonomous systems are divided by an inter-provider boundary 42.

The first customer network 12 includes a customer edge (CE) router 20 in communication with a provider edge (PE) router 22 within the provider network 10. A customer edge router provides customer access to a service provides network over a link to one or more PE routers. Similarly, a second customer network 14 includes a CE router 24 in communication with a second PE router 26 within the provider network 10.

The first autonomous system 16 of provider network 10 includes an MPLS VPN backbone 28 which is in communication with the first provider edge router 22, the second provider edge router 26, and a third provider edge router 30. A first route reflector 32 within autonomous system 16 is in communication with provider first provider edge router 22, second provider edge router 26 and third provider edge router 30.

The second autonomous system 18 includes a fourth provider edge router 34 a fifth provider edge router 36 and a sixth provider edge router 38 all of which are communication with a second route reflector 40.

A route reflector may have client and non-client peers. A client may be provider router, and a non-client peer may be another route reflector. On receipt of ORF entries a route reflector may build an outbound route filter toward the advertising peer. Outbound Route Filtering (ORF) provides a BGP-based mechanism that allows a router to send to its BGP peers a set of route filters that the peer may use to constrain/filter its outbound routing updates toward the advertising peer. PE-routers advertise ORF messages to route reflectors and the content of the ORFs may be used to filter the routes advertised by route reflectors to PE-routers.

An ORF entry has the format: Address Family Identifier/Subsequent Address Family Identifier (AFI/SAFI), ORF-type, Action, Match, and ORF-value. An ORF update may include one or more ORF entries that have a common AFI/SAFI and ORF-type. The components of the ORF entry are defined as follows. The "AFI/SAFI" component provides a coarse granularity control by limiting the ORF to only the routes who's Network Layer Reachability Information (NLRI) matches the "AFI/SAFI" component of the ORF. The "ORF-Type" component determines the content of the ORF-value. The "Action" component controls the handling of the ORF request by the remote peer. Action can be one of ADD, REMOVE, and REMOVE-ALL. ADD adds an ORF entry to the Outbound Route Filter on the remote peer; REMOVE deletes a previously installed ORF entry on the remote peer; and REMOVE-ALL deletes the previously installed entries in the specified ORF on the remote peer. The "Match" component is used if support of matching granularity on a per ORF entry basis is needed, in which case the "Match" component can be one of PERMIT or DENY. PERMIT is used to request the peer to pass updates for the set of routes that match the ORF entry. DENY is used to request the peer not to pass updates for the set of routes that match the ORF entry ORF entries are carried within BGP Route-Refresh messages and can be distinguished between normal route-refresh messages (e.g. those not carrying ORF entries) by using the message length field within the BGP message header. A single route-refresh message can carry multiple ORF entries although they all share the same AFI/SAFI and ORF-type.

The encoding of each ORF entry includes a common part and type-specific part. The common part includes the AFI/SAFI, ORF-Type, Action, and Match components and is encoded as follows:

The AFI/SAFI component of an ORF entry is encoded in the AFI/SAFI field of the route-refresh message. Following the AFI/SAFI component is a one-octet "When-to-refresh" field. The value of this field can be one of IMMEDIATE (0x01) or DEFER (0x02)

Following the "When-to-refresh" field is a collection of one or more ORFs, grouped by ORF-Type. The ORF-Type component is encoded as a one-octet field The Length of ORFs component is a two-octet field that contains the length (in octets) of the ORF entries as follows:

Address Family Identifier (2 octets)
|Reserved (1 octet)
Subsequent Address Family Identifier (1 octet)
When-to-refresh (1 octet)
ORF Type (1 octet)
Length of ORFs (2 octets)
| First ORF entry (variable)
Nth ORF entry (variable)
ORF Type (1 octet)
Length of ORFs (2 octets)
First ORF entry (variable)
Nth ORF entry (variable)

The rest of the components in the common part are encoded in the first octet of each ORF-entry as follows (from the most significant to the least significant bit):

Action is a two-bit field. The value of this field is 0 for ADD, 1 for REMOVE, and 2 for REMOVE-ALL. Match is a one-bit field. The value of this field is 0 for PERMIT and 1 for DENY. This field is significant only when the value of the Action field is either ADD or REMOVE. Reserved is a 5-bit field. It is set to 0 on transmit and ignored on receipt.

Action (2 bit)
Match (1 bit)
Reserved (5 bits)
Type specific part (variable)

The "Extended Communities" ORF-type is defined with a value of 3 and the type specific part of this entry consists of a single "route-target".

The present invention allows the information generated by ORF to extend beyond a single hop, and across Autonomous System boundaries. ORF entries are not advertised as received from a receiving peer to another peer but rather the receiving peer can use the information to build its own local ORF entries and ORF-lists so as to attract routing information from its non-client or ASBR peers.

Each route reflector may have client and non-client peers. A client may be defined as a PE-router and/or ASBR-router, and a non-client peer may be another route reflector. A route reflector may service other clients that do not require ORF functionality.

As shown in FIG. 1, on receipt of ORF-entries a route reflector 32 may build an outbound route filter toward the advertising peer (PE1, PE2 or PE3). The route reflector 32 is able to build outbound route filters for all of its local PE router and ASBR clients based on the ORF-entries that it receives.

Having received ORF-entries from all of its client peers, the route reflector is able to send only the necessary routing information on the peering session to each individual client. This prevents the PE routers from having to use the Automatic Route Filtering (ARF) functionality, as they will not receive routes from the route reflector that they have no local import policy for.

Once a route reflector has received all of its clients ORF-entries, it has all the necessary information to perform outbound route filtering toward those clients. However, in order to attract routing information for the combined set of client "route-targets" the route reflector must indicate a desire to receive such information from its non-client peers e.g. other route reflectors. This is achieved by sending the received ORF-entries to non-client peers e.g. the ORF-entries become transitive, but this method may create problems such as ORF loops. Therefore the architecture detailed in this document proposes the creation of an "ORF list".

An ORF list is a union or concatenation of all ORF-entries that have been received from clients and ORF lists received from client or non-client peers. An ORF list is only sent to non-client peers of the route reflector unless specifically configured otherwise (such as in the case of an ASBR-router). A new ORF-type (type 4) is used to indicate that the ORF-entry contains a list of Extended Communities that are of interest to the advertising peer, as well as the originating AS number. When the ORF-list is sent to an internal peer within the originating AS then the AS number is set to "all Zero's". When the ORF-list is sent to an external peer, the local AS number is added to any entries that contain a zero AS number.

The format of ORF-type 4 is as follows:

Action (2 bit)
Match (1 bit)
Reserved (3 bits)
External Hop Count (2 bits)
Type specific part (variable)

Action is a two-bit field. The value of this field is 0 for ADD, 1 for REMOVE, and 2 for REMOVE-ALL. Match is a one-bit field. The value of this field is 0 for PERMIT and 1 for DENY. This field is significant only when the value of the Action field is either ADD or REMOVE. Reserved is a 3-bit field. It is set to 0 on transmit and ignored on receipt. External Hop Count is a 2-bit field that is used to prevent loops. If both bits are set then an ORF-list will be ignored and dropped upon receipt from an External peer. The type specific part of the ORF-type is variable in length and carries one or more "route-target" values, as well as the associated Autonomous System number of the source of that route-target. The Autonomous System number is set to 0 by the originating AS when the ORF list is ent to Internal peers.

The actions taken on processing of an ORF-list by a receiving route reflector are dependent on whether the ORF-list was received from an Internal or External BGP peer. In either case, the route reflector builds an Outbound Route Filter toward the advertising route reflector peer based on the ORF-list entries. Using this mechanism each route reflector is able to only advertise the routes that a non-client peer is interested in receiving and therefore restrict the scope of where routing information is stored within the Autonomous System.

When an ORF-list is received from an internal non-client peer then the route reflector takes the following action. The route reflector builds an ORF Outbound Route Filter toward the advertising internal peer based on the received ORF list. The Route reflector will then generate an ORF-list based on ORF-entries received from client peers and ORF-lists received from external non-client peers. The route reflector will set the AS number in the ORF-list "route-target" entries to the local Autonomous System number if the ORF entries were received from internal peers. If the AS number field is already set then the route reflector will take no action regarding the AS number. The resulting ORF list is then advertised to all non-client peers.

When an ORF-list is received from an external peer then the route reflector will take the following action. The route reflector will build an ORF Outbound Route Filter toward the advertising external peer. If an ORF-list entry contains the AS number of the local receiving AS, then it is ignored. If an ORF entry has both 'External Hop Count' bits set, then it is ignored. The route reflector generates an ORF-list toward Internal and External BGP non-client peers, increasing the 'External Hop Count' bits by one for all entries received from External peers.

A route reflector will advertise an ORF list to internal peers. The route reflector will build an ORF list based on the ORF entries and the ORF lists received, and will advertise the ORF list to internal peers.

A route reflector will also advertise an ORF list to external peers. The route reflector will build an ORF list based on the ORF entries and the ORF lists received, and will advertise the ORF list to external peers. The route reflector will set the local AS number on all local ORF entries advertised in ORF lists.

Figure 2:
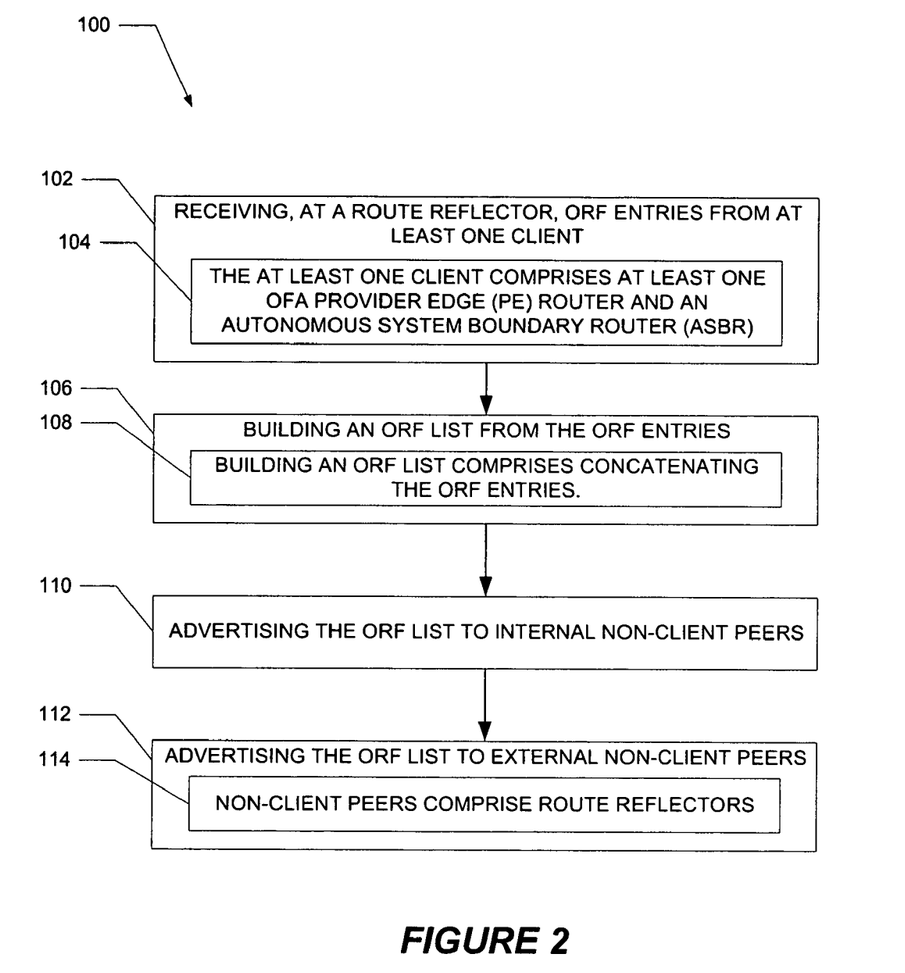
FIG. 2 comprises a flow diagram of a particular embodiment of a method of building an ORF list.
Figure 3:
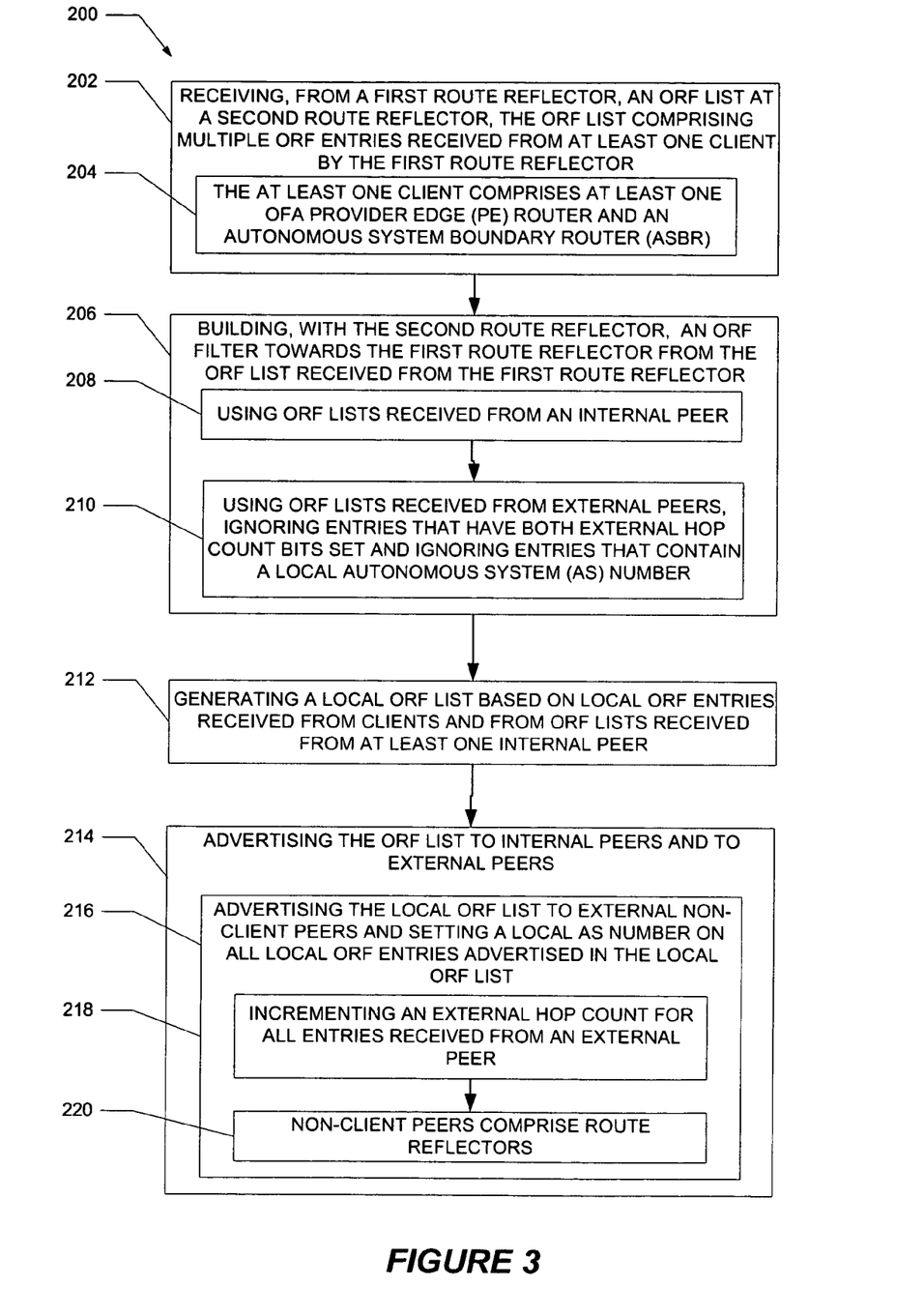
FIG. 3 comprises a flow diagram of a particular embodiment of building an ORF filter from an ORF list.

A flow chart of the presently disclosed method is depicted in FIGS. 2 and 3. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 for building an ORF list is shown. The method 100 is performed by a route reflector (e.g., route reflector 32 of FIG. 1) when operating in accordance with embodiments of the invention. The process begins with processing block 102, which states receiving, at a route reflector, ORF entries from at least one client. The ORF entries have the format: Address Family Identifier/Subsequent Address Family Identifier (AFI/SAFI), ORF-type, Action, Match, and ORF-value.

Processing block 104 discloses that the at least one client comprises at least one provider edge (PE) router and an Autonomous System Boundary Router (ASBR).

Processing block 106 recites building an ORF list from said ORF entries. This may be accomplished, for example, by concatenating the received ORF entries into a list.

Processing block 108 states advertising said ORF list to internal non-client peers, and processing block 110 discloses advertising said ORF list to external non-client peers. An internal non-client peer in a non-client peer within the same AS, and an external non-client peer is a non-client peer in a different AS.

Processing block 112 recites that the non-client peers comprise route reflectors.

Referring now to FIG. 3, a particular embodiment of a method 200 for building ORF filters is shown. The method 200 is performed by another route reflector (e.g., route reflector 40 of FIG. 1) when operating in accordance with embodiments of the invention. The method starts with processing block 202 which discloses receiving, from a first route reflector, an ORF list at a second route reflector, said ORF list comprising multiple ORF entries received from at least one client by said first route reflector. The ORF list, for example, may be provided by the method described with respect to FIG. 2.

Processing block 204 states the at least one client comprises at least one of a Provider Edge (PE) router and/or an Autonomous System Boundary Router (ASBR).

Processing block 206 recites building, with said second route reflector, an ORF filter towards said first route reflector. The filter is built using the ORF list received from the first route reflector.

Processing block 208 discloses using ORF lists received from at least one internal peer.

Processing block 210 states using ORF lists received from external peer. Entries that have both external hop count bits set are ignored, as are entries that contain a local Autonomous System (AS) number.

Processing block 212 recites generating a local ORF list based on local ORF entries received from clients and from ORF lists received from at least one internal peer.

Processing block 214 discloses advertising said local ORF list to internal peers and advertising said local ORF list to external peers Processing block 216 states advertising the local ORF list to external non-peers and setting a local AS number on all local ORF entries advertised in the local ORF list.

Processing block 218 recites incrementing an external hop count for all entries received from an external peer. This done to help in preventing routing loops.

Processing block 220 discloses that non-client peers comprise route reflectors.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system (e.g., within random access memory or RAM). It is also to be understood that other embodiments of the invention can provide the applications operating within the processor as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of building an Outbound Route Filtering (ORF) filter comprising:
   receiving, from a first route reflector, an ORF list at a second route reflector, said ORF list comprising multiple ORF entries received from at least one client by said first route reflector; and
   building, with said second route reflector, an ORF filter towards said first route reflector from said ORF list received from said first route reflector;
   wherein building, with said second route reflector, the ORF filter towards said first route reflector from said ORF list received from said first route reflector comprises:
   receiving an ORF-list from an internal non-client peer;
   building an ORF Outbound Route Filter toward an advertising internal peer based on the received ORF list;
   generating an ORF-list based on ORF-entries received from client peers and ORF-lists received from external non-client peers;
   setting an Autonomous System number in route-target entries of the ORF-list to a local Autonomous System number; and
   advertising the resulting ORF list to all non-client peers.

2. The method of claim 1 further comprising generating a local ORF list based on local ORF entries received from clients and from ORF lists received from at least one internal peer.

3. The method of claim 2 further comprising advertising said local ORF list to internal peers and advertising said local ORF list to external peers.

4. The method of claim 1 wherein said building an ORF filter further comprises using ORF lists received from an internal peer.

5. The method of claim 4 wherein said building a filter further comprises using ORF lists received from external peers, ignoring entries that have both external hop count bits set and ignoring entries that contain a local Autonomous System (AS) number.

6. The method of claim 5 further comprising incrementing an external hop count for all entries received from an external peer.

7. The method of claim 3 wherein said advertising the local ORF list further comprising advertising said local ORF list to external non-client peers and setting a local AS number on all local ORF entries advertised in said local ORF list.

8. The method of claim 1 wherein said at least one client peer comprises at least one of a Provider Edge (PE) router and an Autonomous system Boundary Router (ASBR) and wherein said non-client peers comprise route reflectors.

9. The method of claim 3 wherein said internal peers comprise peers in a same Autonomous System (AS) and external peers comprise peers in a different AS.

10. An apparatus for building Outbound Route Filtering (ORF) filters for performing ORF comprising:
    a first route reflector which is configured to communicate with a second router reflector, wherein said second route reflector receives an ORF list from said first route reflector and builds an ORF filter towards said first route reflector from said ORF list;
    wherein building, with said second route reflector, the ORF filter towards said first route reflector from said ORF list received from said first route reflector comprises:
    receiving an ORF-list from an internal non-client peer;
    building an ORF Outbound Route Filter toward an advertising internal peer based on the received ORF list;
    generating an ORF-list based on ORF-entries received from client peers and ORF-lists received from external non-client peers;
    setting an Autonomous System number in route-target entries of the ORF-list to a local Autonomous System number; and
    advertising the resulting ORF list to all non-client peers.

11. The apparatus of claim 10 wherein said second route reflector generates a local ORF list based on local ORF entries received from clients and from ORF lists received from at least one internal peer.

12. The apparatus of claim 11 wherein said second route reflector advertises said local ORF list to internal peers and advertises said local ORF list to external peers.

13. The apparatus of claim 10 wherein said second route reflector builds said ORF filter using ORF lists received from an internal peer.

14. The apparatus of claim 10 wherein said second route reflector builds said filter using ORF lists received from external peers, ignoring entries that have both external hop count bits set and ignoring entries that contain a local Autonomous System (AS) number.

15. The apparatus of claim 14 said second route reflector increments an external hop count for all entries received from an external peer.

16. The apparatus of claim 12 wherein said second route reflector advertises said local ORF list to external non-peers and sets a local AS number on all local ORF entries advertised in said local ORF list.

17. The apparatus of claim 10 wherein said at least one client peer comprises at least one of a Provider Edge (PE) router and an Autonomous system Boundary Router (ASBR) and wherein said non-client peers comprise route reflectors.

18. The apparatus of claim 12 wherein said internal peers comprise peers in a same Autonomous System (AS) and external peers comprise peers in a different AS.

19. A method of performing ORF filtering comprising:
    providing an ORF list comprising:
    receiving, at a first route reflector, ORF entries from at least one client; and
    building, at the first route reflector, an ORF list from said ORF entries;

advertising, at the first route reflector, said ORF list to internal non-client peers;

advertising, at the first route reflector, said ORF list to external non-client peers;

receiving, from the first route reflector, an ORF list at a second route reflector, said ORF list comprising multiple ORF entries received from at least one client by said first route reflector; and building, with said second route reflector, an ORF filter towards said first route reflector from said ORF list received from said first route reflector.

20. A system comprising:

a first Autonomous System (AS) comprising:

a first route reflector; and a plurality of clients in communication with said first route reflector; and a second AS in communication with said first AS, said second AS comprising:

a second route reflector; and a second plurality of clients in communication with said second route reflector, wherein said first route reflector receives ORF entries from at least one of said first plurality of clients, builds an ORF list from said ORF entries and advertises said ORF list to non-client peers within said first AS and to non-client peers with said second AS and wherein said second route reflector receives said ORF list from said first route reflector and builds an ORF filter towards said first route reflector from said ORF list;

wherein building, with said second route reflector, the ORF filter towards said first route reflector from said ORF list received from said first route reflector comprises:

receiving an ORF-list from an internal non-client peer;

building an ORF Outbound Route Filter toward an advertising internal peer based on the received ORF list;

generating an ORF-list based on ORF-entries received from client peers and ORF-lists received from external non-client peers;

setting an Autonomous System number in route-target entries of the ORF-list to a local Autonomous System number; and advertising the resulting ORF list to all non-client peers.

21. A method of providing Outbound Route Filtering (ORF) lists for performing ORF comprising:

receiving, at a route reflector, ORF entries from at least one client;

building, at the route reflector, an ORF list from said ORF entries;

advertising, by the route reflector, said ORF list to internal non-client peers; and advertising, by the route reflector, said ORF list to external non-client peers;

wherein receiving, at the route reflector, ORF entries from at least one client comprises receiving ORF entries wherein each ORF entry has a format:

Address Family Identifier/Subsequent Address Family Identifier (AFI/SAFI) wherein the AFI/SAFI component provides a coarse granularity control by limiting the ORF to the routes where Network Layer Reachability Information (NLRI) matches the "AFI/SAFI" component of the ORF;

ORF-type, wherein the ORF-type component determines the content of an ORF-value;

Action wherein the Action component controls the handling of an ORF request by a remote peer;

Match, wherein the Match component is configured as one of (i) PERMIT to request the remote peer to pass updates for the set of routes that match the ORF entry and (ii) DENY to request the remote peer not to pass updates for the set of routes that match the ORF entry; and ORF-value.

22. A method of providing Outbound Route Filtering (ORF) lists for performing ORF comprising:

receiving, at a route reflector, ORF entries from at least one client;

building, at the route reflector, an ORF list from said ORF entries;

advertising, by the route reflector, said ORF list to internal non-client peers; and advertising, by the route reflector, said ORF list to external non-client peers;

wherein said building an ORF list comprises concatenating said ORF entries;

wherein said building, at the route reflector, the ORF list comprises forming a union of all ORF-entries that have been received from the at least one client, ORF lists received from client peers, and ORF lists received from non-client peers;

wherein building, at the route reflector, an ORF list from said ORF entries comprises:

when receiving an ORF-list from an internal non-client peer, building by the route reflector an ORF Outbound Route Filter toward the advertising internal peer based on the received ORF list;

generating an ORF-list based on ORF-entries received from client peers and ORF-lists received from external non-client peers, setting, by the route reflector, an Autonomous System (AS) number in the ORF-list route-target entries to the local Autonomous System number, and advertising the resulting ORF list to all non-client peers; and when receiving an ORF-list from an external peer, building by the route reflector an ORF Outbound Route Filter toward the advertising external peer, ignoring an AS number of a local receiving AS if the list entry contains the AS number, and generating an ORF-list toward Internal and External BGP non-client peers.

* * * * *